March 19, 1946.                W. W. GARSTANG ET AL                2,396,998
                                      SPOT LAMP
                     Filed Aug. 21, 1943            2 Sheets-Sheet 1
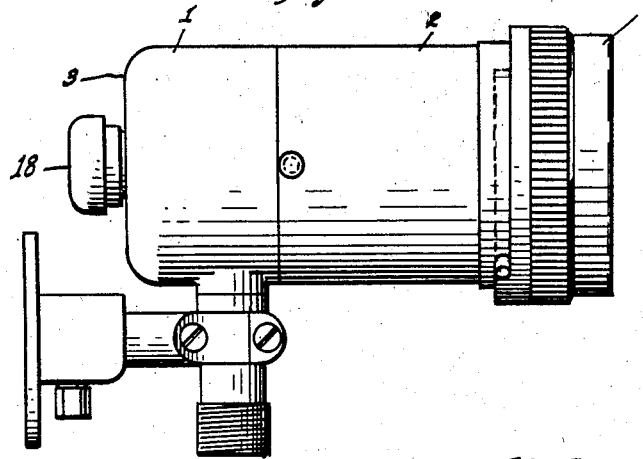
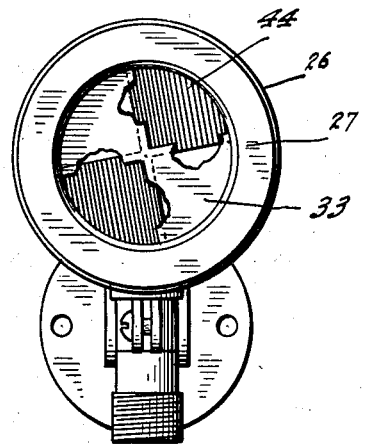
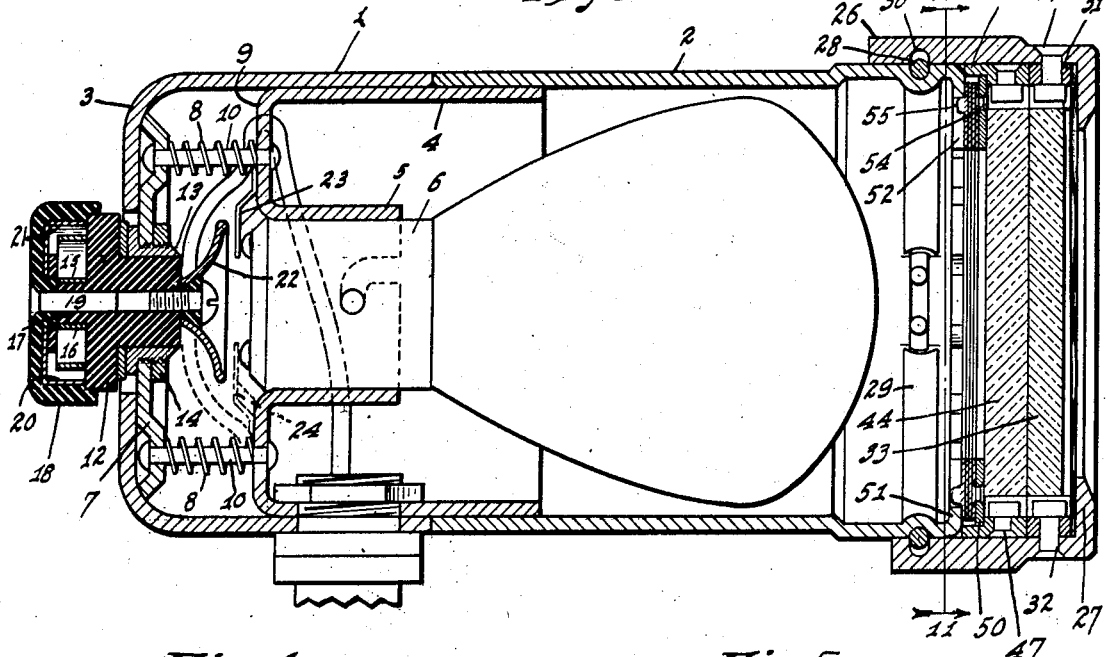
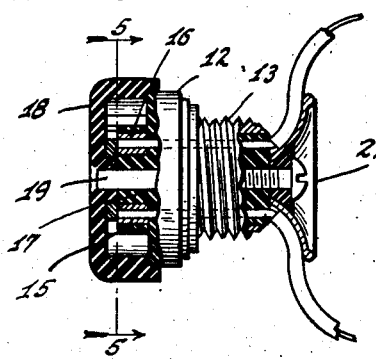
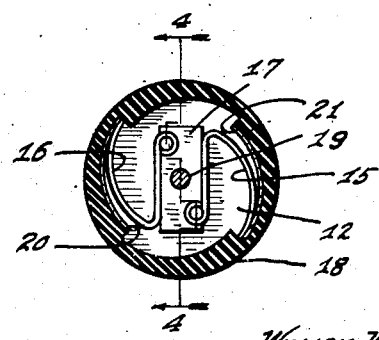
INVENTOR.
WILLIAM W. GARSTANG and
WALTER E. PEEK,
BY   W. P. Hahn
                    ATTORNEY.

March 19, 1946.  W. W. GARSTANG ET AL  2,396,998
SPOT LAMP
Filed Aug. 21, 1943   2 Sheets-Sheet 2
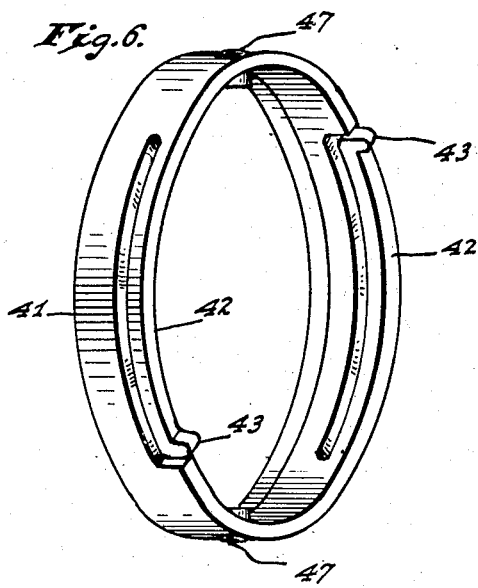
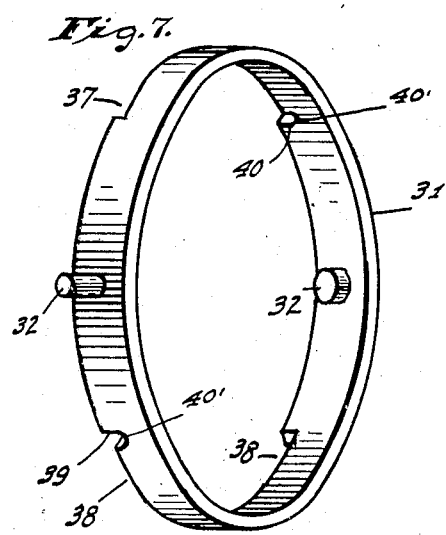
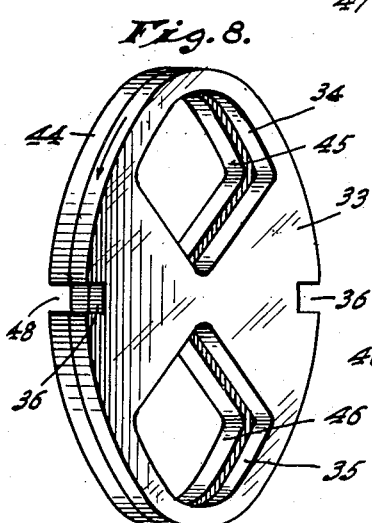
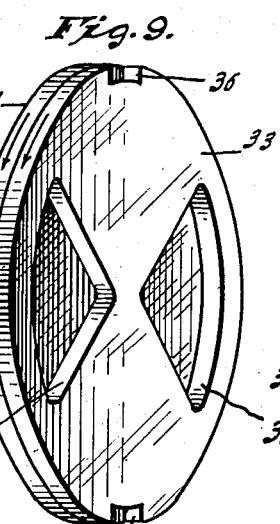
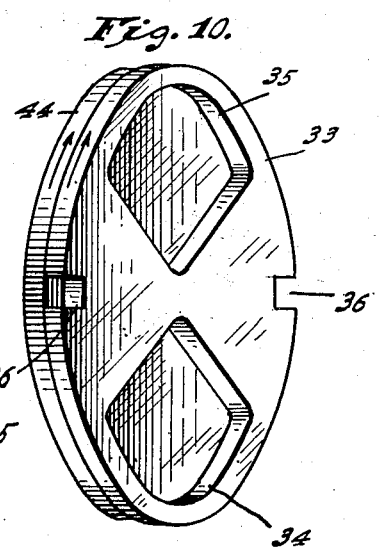
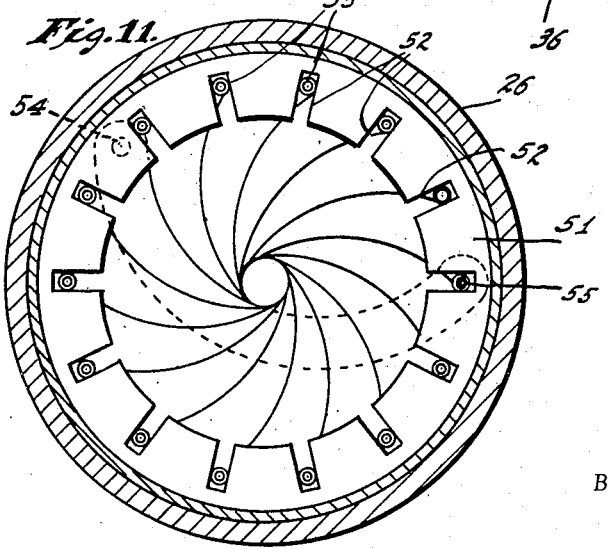
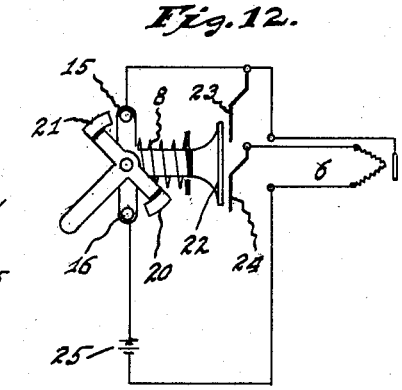
INVENTORS.
WILLIAM W. GARSTANG and
WALTER E. PEEK,
BY
ATTORNEY.

Patented Mar. 19, 1946

2,396,998

UNITED STATES PATENT OFFICE 2,396,998

SPOT LAMP

William W. Garstang and Walter E. Peek, Indianapolis, Ind., assignors to Electronic Laboratories, Incorporated, Indianapolis, Ind., a corporation of Indiana Application August 21, 1943, Serial No. 499,478

3 Claims. (Cl. 240—8.16)

The present invention relates to improvements in lighting equipment and particularly to illuminating apparatus primarily adapted for use in the nature of a spotlight.

More specifically, the invention relates to improvements in an illuminating lamp adapted for giving suitable illumination in the cockpits of airplanes and in like relationship.

One of the objects of the invention is to provide a "spot" lamp which will project visible light rays, which will project ultra-violet or near ultra-violet rays, which in themselves are not visible, and which will provide means for controlling the amount of the invisible light given out by the lamp.

By such an arrangement, we are enabled to provide the pilot of an aircraft with a projector light which will give him sufficient illumination, when desired, for reading his maps and other matter, which will give him a means for illuminating instruments, without displaying a visible light and which will give him a means for controlling the amount of light with which his instruments are illuminated.

Other objects and advantages of the invention will appear more fully from the accompanying specification and claims.

In the drawings illustrating an embodiment of the invention:

Fig. 1 is a side elevation of a lamp embodying the invention;

Fig. 2 is a front elevation, certain of the lenses being broken away;

Fig. 3 is a longitudinal sectional view of the structure illustrated in Fig. 1;

Fig. 4 is a detail section on the line 4, 4 of Fig. 5 of the light control switch;

Fig. 5 is a section on the line 5, 5 of Fig. 4;

Figs. 6 and 7 are perspective views of the rotating members for controlling the lens and light intensity;

Figs. 8 and 9 and 10 are perspective views showing the respective positions of the lenses for non-visible and visible rays;

Fig. 11 is a detail front elevation of the iris structure; and

Fig. 12 is a diagrammatic view of the circuit arrangement of the lamp control.

As shown in the accompanying drawings, we provide a cylindrical shell which may be formed in two sections, a rear section 1 and a front section 2. The rear section is provided with a closed or partially closed rear end 3 and the two sections telescope an inner cup-like shell 4. This inner shell provides a lamp-supporting shell 5 which is adapted to receive the base of a suitable fluorescent type lamp 6. The lamp is secured in the shell 5 by the usual pin and bayonet slot arrangement.

An "on" and "off" and starting switch is mounted at the rear end of the casing section 1 and to this end, we provide a supporting plate 7 which is biased in the outermost position through through the medium of a plurality of coiled springs 8 interposed between the plate 7 and the bottom 9 of the cup-like shell 4. These springs surround suitable guiding posts 10 which are secured in the base portion 9 and project through the plate 7. This plate 7 carries a base 12 of insulating material which has fastened to the stem thereof a threaded sleeve 13 between the shoulder of which and a nut 14 the plate 7 is clamped. The insulating base carries a pair of spring contacts 15 and 16 which are insulated from one another by a suitable insulating rib 17. A rotatable cap 18 covers the top of the base 12 being secured in position to rotate on a central pin 19. This cap carries a pair of contacts 20 and 21 electrically connected and adapted in one position to engage the contacts 15 and 16. Secured on the under face of the base 12 is a cone-shaped contact member 22 which is secured in position by but insulated from the post 19. A pair of spring contacts 23 and 24 are mounted upon but insulated from the base portion 9 of the cup. One of these contacts 24 is connected by a suitable insulating cable with contact 16 of the switch, while the contact 15 of the switch is connected to the supply line so that, as shown in the diagrammatic view in Fig. 11, when the contacts 20 and 21 are bridging contacts 15 and 16, the operating circuit is closed. By thin pressing on the starting switch member until the contact member 22 bridges the contacts 23 and 24, circuit will be closed from the source of supply in the form of a battery 25 to the heater element of the lamp. As soon as the ionization material of the lamp becomes heated and the lamp thus started, the pressure may be relieved on the button, opening the circuit between contacts 23 and 24 but leaving the circuit closed between the anode of the lamp and the cathode, so that the lamp will continue to operate.

For controlling the character of light permitted by the lamp structure and for controlling the intensity of the non-visible rays, we provide a shutter arrangement at the forward end of the shell section 2. To this end, we provide a rotatable cap 26 receiving the open end of the shell section 2. The front end of this cap 26 is provided with an inturned flange 27. The cap 26 is rotatably mounted on the shell 2 but held against axial displacement thereon through the medium of a split ring 28 fitting within an internal bead 29 in the shell 2 and also fitting within the recess 30 in the cap 26.

Behind the flange 27 is arranged a ring 31 which is locked against rotative movement relatively to the cap 26 by suitable pins 32 and within this ring is mounted a shutter 33 provided with triangular wedge-shaped openings 34 and 35. This shutter is provided, at its periphery, with notches 36 which receive the extensions of the pins 32 so that the shutter is locked to rotate with the cap 26 and with the ring 31. The inner edge of the ring 31 is provided with a pair of cutout portions 37 and 38 to provide shoulders 39, 39 and 40, 40. These cutout portions 37 and 38 are provided with rounded notches 40'. Behind the ring 31, we mount a second ring 41 which is provided at its front edge with a pair of spring tongues 42, 42 adapted to ride in the cutout portions 37 and 38 of the ring 31 and provided with tongues 43 adapted, under predetermined conditions, to engage in the notches 40'. This ring carries, within it a second shutter 44 similar to the shutter 33 and having cutout portions 45 and 46 similar to the cutout portions 34 and 35. This shutter 44 is locked against relative rotation with respect to the ring 41 by pins 47 which engage in notches 48 in the shutter.

Behind the shutter 44, we mount a flat ring-like member 50 which fits within an enlarged portion within the ring 41 and abuts against a shoulder which prevents the same from coming in too close contact with the shutter 44. The front end of the casing section 2 is provided with an inturned flange 51 provided with a series of radial slots 52 and between this flange 51 and the ring 50 is mounted a plurality of overlapping iris segments. Each of these segments consists of a thin sheet in the form of a flat segment of a circle. The segments are laid one on top of the other with the end of each projecting beyond the end of the next succeeding. One end of each of the segments is provided with an upturned pin portion 54 which is pivotally secured to the ring 50. The opposite end of the segment is provided with an upturned pin portion 55 which operates in one of the slots 52 of the flange 51 so that, as the ring 50 is rotated in one direction, the segments will be caused to close in until they finally assume the position shown in Fig. 11 or to open up to wide open position.

In operation, the cap or head 26 may be assumed to be, for normal position, rotated to the point where the openings 45 and 46 in the shutter 44 coincide with the openings 34 and 35 in the shutter 33. Under these circumstances, visible rays will be projected from the lamp so that a white or near daylight light is provided by the lamp. By rotating the cap or head 26 counterclockwise, the shutter 33 will be rotated relatively to the shutter 44 until they assume the position illustrated in Fig. 9, whereby the openings in the shutters will be out of register and due to the fact that the shutters are formed of material impervious to the passage of visible rays but pervious to the passage of the near ultraviolet rays developed by the fluorescent lamp 6, such material being preferably in the form of glass, all visible rays will be shut off. During this movement, the fingers 43 will be riding in the cut-outs 37 and 38 and there will be no movement imparted to the ring 41. However, when the shutters have assumed the registered position in Fig. 9, the tongues 43 will abut against the shoulders 40 and 39, causing the ring 41 to rotate with the ring 31 and, as a matter of fact, during this movement, the shutters 33 and 44 will be moving in unison. As the result of this movement, the pivot pins 54 on the iris members will be rotated with the ring 41 and due to the fact that the opposite pins 55 of the iris members are held against rotation, the iris members will commence to close and a continued rotation of the cap or head 26 will gradually close the iris members, cutting down the amount of invisible ray illumination delivered by the lamp structure. It is to be understood, of course, that the iris structure is such that 100% shutting off of the non-visible rays cannot be accomplished but sufficient can be cut off to get satisfactory control. A rotation of the cap or head 26 in the opposite direction will gradually open the iris until full illumination of non-visible rays is obtained. This is due to the fact that the tongues 43 are riding in the notches in the ring 31 and, as a result, the ring 50 will rotate with the ring 31. However, this grip is very light and when the iris members have reached the limit of their opening movement, the tongues 43 will release. A continued rotation of the cap beyond the wide open position of the iris will gradually move the openings of the shutters into register so that a gradual increase in visible illumination is obtained until maximum visible illumination is provided.

It is understood that such parts as are intended to be "illuminated" by the non-visible rays are coated with a fluorescent material which becomes energized under the influence of the non-visible or near ultraviolet rays so that these parts will be visible without any visible light being displayed.

We claim as our invention:

1. In a lamp structure having an open-ended cylindrical casing adapted to receive a lamp capable of emitting visible and invisible light rays, a first shutter associated with said casing and adapted for opening and closing to control the emission of light rays from said casing, a second shutter associated with said casing for controlling the emission of visible and invisible light rays from said casing and including a pair of visible light screen members having openings adapted to coincide to permit the passage of visible light rays, a rotatable driving member mounted on said casing and carrying one of the pair of said screens, a rotatable driven member mounted on said casing, controlling the opening and closing of said first shutter and carrying the other of said pair of screen members, and a driving connection between the driving members and the driven member engageable after the driving member has been rotated relatively to the driven member for a predetermined distance for effecting a coincident rotation of said driving and driven members and releasable after the driving member and said driven members have been rotated in unison for a predetermined distance in the opposite direction to permit a continued rotation of the driving member independently of the driven member.

2. In a lamp structure having an open-ended cylindrical casing adapted to receive a lamp capable of emitting visible and invisible light rays, an iris shutter adapted for opening and closing to control the emission of light rays from said casing, a screen shutter for controlling the emission of visible and invisible light rays from said casing and including a pair of visible light screen members adapted to coincide to permit the passage of invisible light rays, a rotatable support mounted on said casing for one of the pair of said screens, a rotatable support mounted on said casing and carrying the other of said screens and operatively connected with said iris shutter for opening and closing the same, an abutment on said first mentioned rotatable support, an abutment member on said second mentioned support adapted to be engaged by said abutment after said first rotatable member has been rotated a predetermined distance and a releasable latch member on said second mentioned rotatable member engageable with a latch portion on said first mentioned rotatable member when said abutment member engages said abutment, whereby said two rotatable members may be rotated in unison in either direction for controlling the opening and closing of said iris shutter, said latch member being releasable after the members have been rotated in unison in one direction for a predetermined distance to permit the independent rotation of said first rotatable member.

3. In a lamp structure having an open-ended cylindrical casing adapted to receive a lamp capable of emitting visible and invisible light rays, an iris shutter associated with said casing adapted for opening and closing to control the emission of light rays from said casing, a screen for controlling the emission of visible and invisible light rays associated with said casing and including a pair of visible light screen members having openings adapted to coincide to permit the passage of visible light rays, a rotatable member mounted on said casing and carrying one of the pair of said screen members, a second rotatable member mounted on said casing and carrying the other of said pair of screen members, said second rotatable member being operatively connected with said iris for effecting the opening and closing thereof, a releasable driving connection between said first rotatable member, permitting a relative rotation between said first and second rotating members and engageable after said first rotatable member has been rotated a predetermined distance relatively to the second rotatable member and releasable when the second rotatable member has been prevented from rotation in the opposite direction by the movement of the iris shutter to full open position.

WILLIAM W. GARSTANG.
WALTER E. PEEK.